(No Model.)　　　　　E. H. MURDOCK.　　4 Sheets—Sheet 1.
CHECK CASH REGISTER AND INDICATOR.
No. 471,342.　　　　　　　　Patented Mar. 22, 1892.
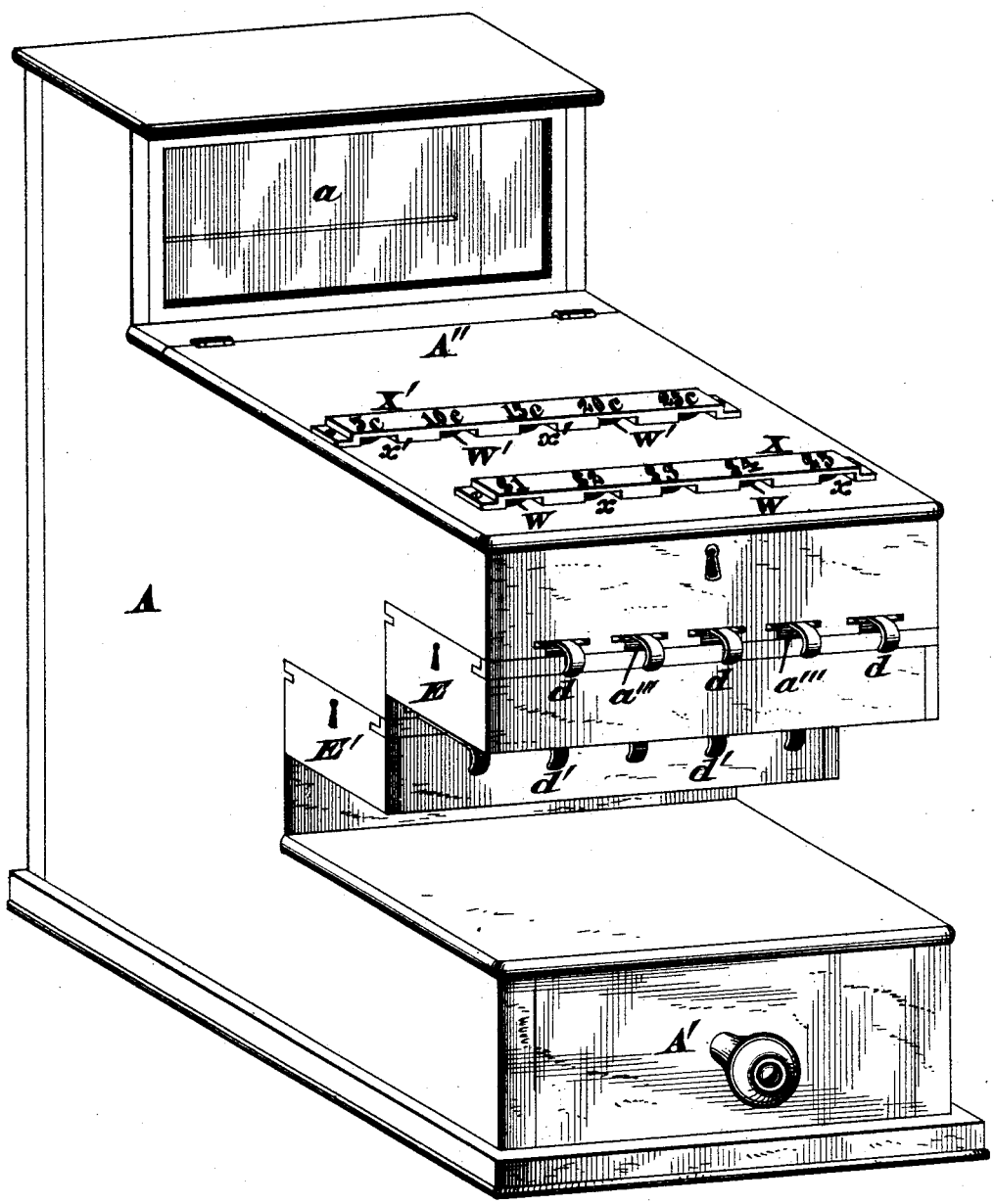

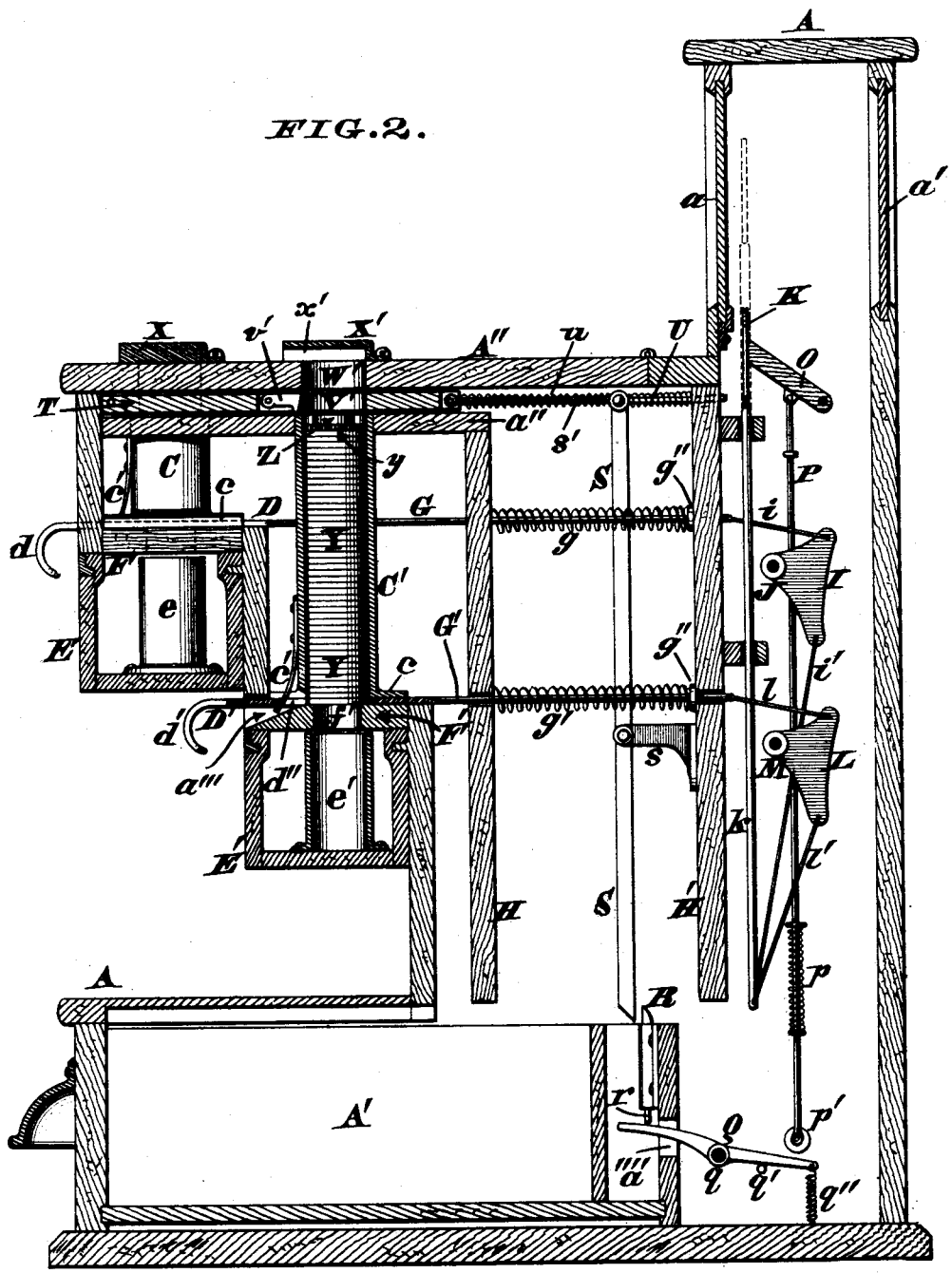

(No Model.) 4 Sheets—Sheet 3.
E. H. MURDOCK.
CHECK CASH REGISTER AND INDICATOR.
No. 471,342. Patented Mar. 22, 1892.
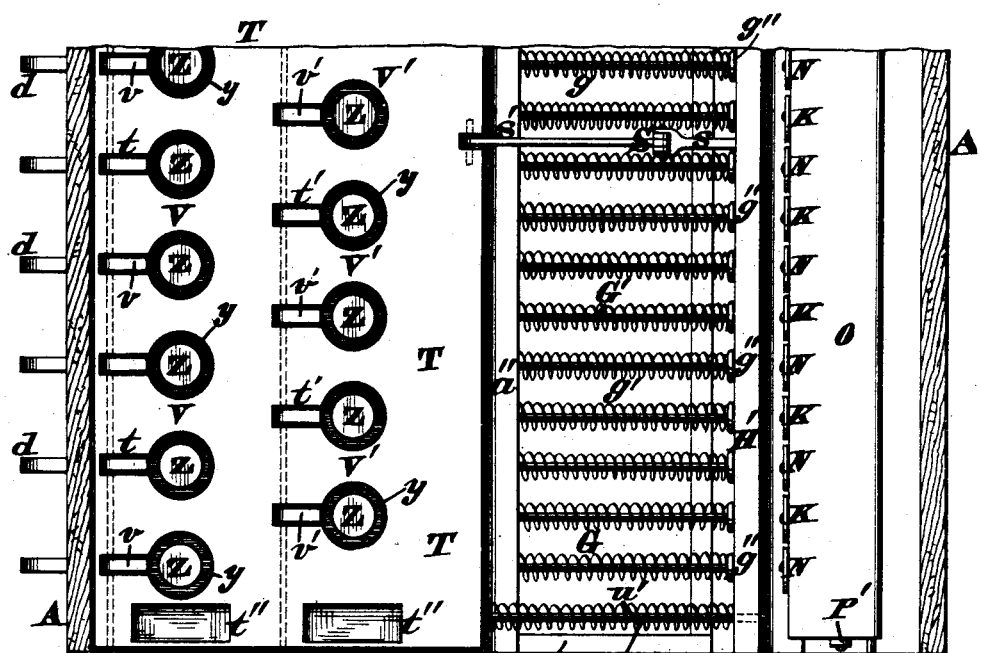
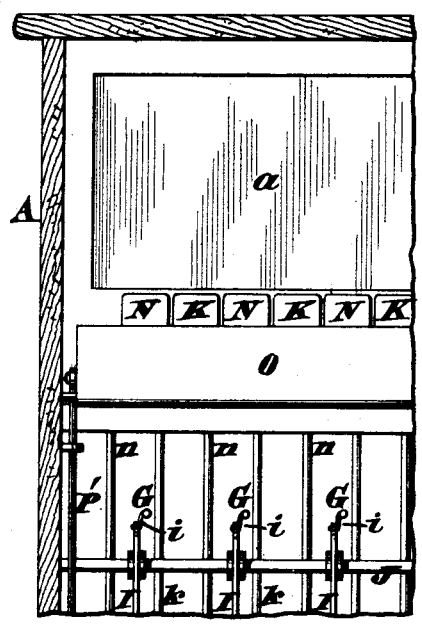
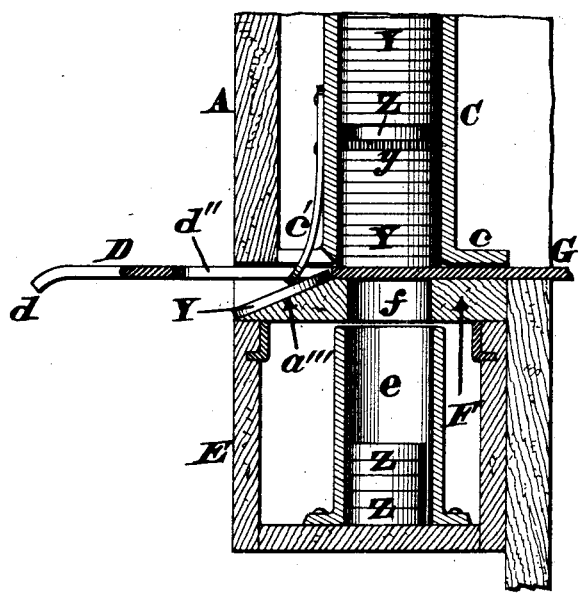

(No Model.) 4 Sheets—Sheet 4.
E. H. MURDOCK.
CHECK CASH REGISTER AND INDICATOR.
No. 471,342. Patented Mar. 22, 1892.
FIG.6.
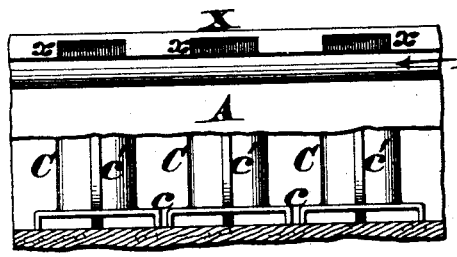
FIG.8.
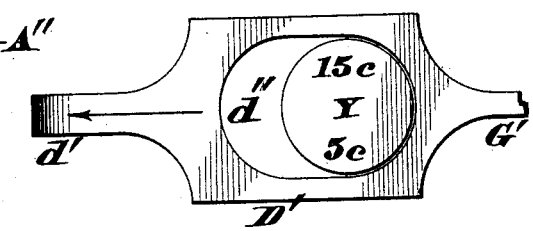
FIG.7.
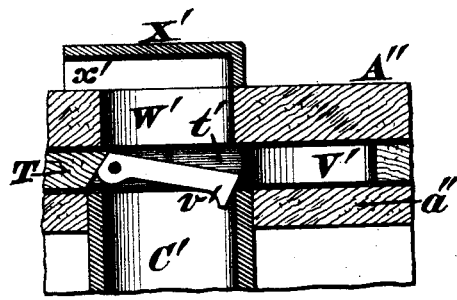
FIG.9.
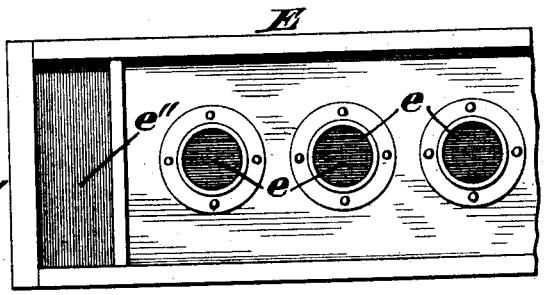
FIG.11.
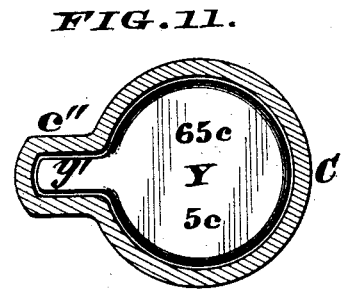
FIG.10.
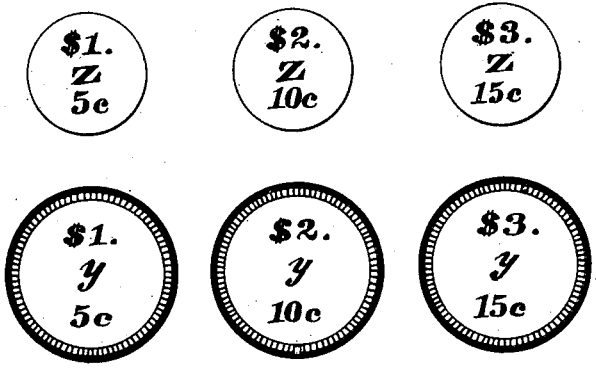
FIG.12.
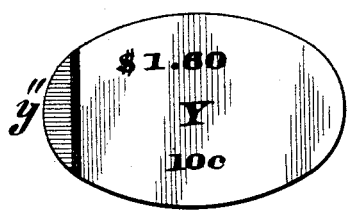
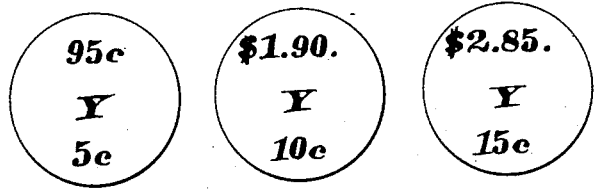
Attest.
L. B. Layman.
Samuel H. Quinn.
Inventor.
Edwin H. Murdock
by James H. Layman
Atty.
THE NORRIS PETERS CO., PHOTO-LITHO., WASHINGTON, D. C.

UNITED STATES PATENT OFFICE.

EDWIN H. MURDOCK, OF CINCINNATI, OHIO.

CHECK CASH REGISTER AND INDICATOR.

SPECIFICATION forming part of Letters Patent No. 471,342, dated March 22, 1892.

Application filed December 14, 1891. Serial No. 414,999. (No model.)

*To all whom it may concern:*

Be it known that I, EDWIN H. MURDOCK, a citizen of the United States, residing at Cincinnati, in the county of Hamilton and State of Ohio, have invented certain new and useful Improvements in a System for Keeping an Account of Sales and a Machine for Operating said System; and I do hereby declare the following to be a full, clear, and exact description of the invention, reference being had to the annexed drawings, which form part of this specification.

My invention comprises a system or method whereby a salesman is compelled to keep an accurate account of all purchases made from him during a day or other definite period of time, the mode of operating said system being as follows: A series of convenient counters are provided, and numbered five, ten, fifteen, and so on until one hundred is reached, which counters are designed to represent cents, and each denomination is kept in a separate receptacle. Another series of counters are provided, and numbered one, two, three, and so on up to ten or twenty, and are designed to represent dollars, the different denominations of the same being also kept in separate receptacles. Furthermore, these receptacles are so arranged as to enable one counter to be readily removed from the bottom and then to be immediately inserted at the top of the proper receptacle, in order that the same counters may be employed consecutively and continuously. The counter thus removed must correspond in number with the price of the article purchased, and the simple act of withdrawing said counter is made the means of exposing a suitably-numbered tablet or indicator, and, if desired, of sounding a bell or gong to give audible notice of the proper record being made. Each receptacle must be provided with a "tally," and when all the counters have made one complete circuit through its respective receptacle said tally is automatically deposited in a special compartment, which is inaccessible to the salesman. He must then insert a second tally at the top of the receptacle, which tally will be deposited in said special compartment as soon as the counters have completed another circuit through the receptacle to which they belong. By this method a simple inspection of the tallies and the upper counters in each receptacle will show at any time the exact amount of purchases made and without using recording disks or tapes or making long and tedious calculations.

My invention further comprises a special machine which enables these various movements to be effected with the utmost ease and accuracy, the machine being constructed on the general plan of a cash indicator and register and being so arranged that the pulling forward of a series of slides will eject the counters, expose the tablets, and deposit the tallies.

My invention also includes certain details in the construction of said machine.

In the annexed drawings, Figure 1 is a perspective view of the preferred construction of machine employed for carrying my system into operation, the machine being shown in its normal or set condition. Fig. 2 is an enlarged vertical section taken from front to rear of the machine and in the plane of one of the longest counter-receptacles of the same. Fig. 3 is a plan taken directly under the lid of the machine, the sides of the case or cabinet being sectioned. Fig. 4 is a vertical section of a portion of the upper part of the rear of the machine. Fig. 5 is an enlarged vertical section showing a slide in the act of ejecting a counter from its receptacle, a number of tallies being seen in a drawer located beneath said receptacle. Fig. 6 is a front elevation of three of said receptacles, the slides being omitted therefrom. Fig. 7 is a detail view showing how the money-drawer is locked until each receptacle is charged with its proper number of counters. Fig. 8 is an enlarged plan showing a counter seated within a slotted slide. Fig. 9 is a plan of a portion of one of the drawers that receives the tallies. Fig. 10 shows the preferred way of numbering the counters and tallies. Figs. 11 and 12 show modified forms of the counters.

The external case or cabinet A resembles those applied to ordinary cash indicators and registers and is furnished with a sliding money-drawer A', a hinged top or lid A'', and one or more windows $a\ a'$, which latter permit the elevated tablets being seen. Secured a slight distance below the horizontal lid A'' and parallel therewith is a partition $a''$, within which are fastened the upper ends of two distinct sets of tubes C C′, the front ones C of which are relatively shorter than the rear tubes C′. These tubes are cylindrical, and their lower ends rest upon the bases $c$, as represented more clearly in Fig. 6, the object of these bases being to permit a free movement of reciprocating slides D D′, the outer ends of which latter terminate with curved handles or pulls $d\,d'$, as seen in Fig. 2. Furthermore, each slide is slotted at $d''$, as more clearly represented in Figs. 5 and 8, for a purpose that will presently appear. $c'$ are short plate-springs secured to the front of tubes C C′, the lower or free ends of these springs being passed through the slots $d''$ of the slides and extending down almost to inclined chutes $a'''$ of the case, a separate chute being provided for each tube in the machine.

E E′ are sliding drawers arranged under the tubes, the upper drawer E being provided with a series of pockets $e$, one for each of the tubes C, and the lower drawer being furnished with a set of pockets $e'$, one for each of the tubes C′. It is preferred to provide the end of each drawer with a division $e''$, (seen in Fig. 9,) to hold cards or slips of paper, upon which a permanent record of each day's sales can be kept, if desired.

F F′ are horizontal partitions above the drawers E E′ and serving to support the bases $c$, said partitions being bored through at $f f'$, which passages are materially less in diameter than the tubes C C′, with which they are accurately in line.

The slides D D′ terminate at their rear or inner ends with stems G G′, around which are coiled springs $g\,g'$, that press against collars $g''$ of said stems and thereby maintain said slides in their normal or retracted positions. These stems play freely within suitable openings of vertical partitions H H′ of the cabinet, and the upper set of stems G have wires $i$ attached to them, which wires connect with bell-cranks I, hung upon a rod J, secured across the rear part of the case. $i'$ are other wires that connect these bell-cranks with the lifting-rods $k$ of tablets K. The lower series of stems G′ have wires $l$ attached to them, which wires connect with bell-cranks L, hung upon a rod M, secured under the rod J and parallel with it. $l'$ are other wires that connect these bell-cranks L with the lifting-rods $n$ of tablets N. (Seen only in Fig. 4.)

O is an inclined clamp-bar, pivoted at its ends to the sides of the case, and usually held in its normal position by a spring $p$ at the lower part of a rod P, the upper end of the latter being coupled to said bar O. This rod P is suitably guided in the case, and its lower end carries a small roller $p'$, and, if desired, said rod can be duplicated on the opposite side of the case, as seen at P′ in Figs. 3 and 4. Located directly below the roller $p'$ is a lever Q pivoted to the side of the case at $q$, and normally pulled down against a stop-pin $q'$ by a spring $q''$. The front end of this lever traverses a slot $a''''$ in the rear end of the money-drawer A′, and is in contact with a downward extension $r$ of a spring-bolt R, secured to this end of said drawer. When the drawer is closed, this spring-bolt R is immediately in the rear of the lower end of a lever S, hung upon a bearing $s$ projecting from the vertical partition H′, the upper end of said lever being coupled by a link $s'$ to the rear edge of a reciprocating locking-plate T, fitted to play freely between the lid A″ and horizontal partition $a''$. This plate is held in its normally-retracted position by means of springs $u\,u'$, coiled around rods U U′, the front ends of the latter being secured to said plate and their rear ends being passed through holes in the upper part of the partition H′. Locking-plate T is provided with a series of circular openings V, directly over the entrance of tubes C, and another series of similar openings V′ over the entrance of the rear tubes C′. Extending from the front sides of openings V V′ are slots $t\,t'$, within which are hung pawls $v\,v'$, whose peculiar shape is more clearly seen in Fig. 7.

W W′ are holes made in the lid A″ and in line with the tubes C C′, said holes being covered with guard-plates X X′, having passages $x\,x'$. These guard-plates may be screwed upon the lid, as seen in Fig. 1, or they may be hinged thereto, as represented in Fig. 2.

Y represent the "counters" of uniform thickness and made of metal or celluloid or other suitable material, and being of such a diameter as to readily enter the tubes C C′ and rest upon each other, as seen in Figs. 2 and 5. The uppermost counter $y$ must be arranged in some manner to be readily distinguished from its companions, although it is of the same diameter and size. As seen in Figs. 2, 3, and 5, the periphery of this upper counter is notched or corrugated, while in Fig. 10 the margin of said counter is represented as being "milled" or roughened.

Z represents a tally of somewhat greater thickness than the counters, but of relatively less diameter, in order that it may readily drop through either of the holes $f$ or $f'$.

The exact method of numbering the counters and tallies is immaterial; but as a matter of convenience I prefer the arrangement seen in Fig. 10, which shows how said devices would be designated in case each of the longer tubes should be constructed to hold twenty counters and one tally. The three disks at the left of said illustration show the nineteenth and twentieth counters and the tally for the five-cent tube. It will be noticed that the nineteenth counter Y is marked "95c.," while the twentieth counter $y$ is marked "$1," and the tally Z is also marked "$1," or, in other words, the value of each counter is increased by five, beginning at the bottom of the tube. The three disks in the center of the illustration show the nineteenth and twentieth counters and the tally for the ten-cent tube, the nineteenth counter Y being marked "$1.90" and the twentieth counter $y$ being marked "$2." The tally Z is also marked "$2." This shows that the value of each counter is increased by ten, beginning at the bottom of the tube. The three disks at the right of the illustration show the nineteenth and twentieth counters and the tally for the fifteen-cent tube, the nineteenth counter Y being marked "$2.85" and the twentieth counter $y$ being marked "$3." The tally Z is also marked "$3." This shows that the value of each counter is increased by fifteen, beginning at the bottom of the tube. This system of marking is carried out with all the counters to be placed in the tubes indicating cents; but the counters for the dollar-tubes are increased in value according to the tubes they occupy. Thus if there were ten counters in the one-dollar tube the upper counter would be marked "$10," while the similar counter in the two-dollar tube would be marked "$20," and so on throughout the entire system.

The above-described machine is set and operated in the following manner: The various tubes C C' are first filled with the appropriate counters and tallies, the counters Y being dropped in at the top of each tube in regular order, and being surmounted by the special counters $y$, upon which latter the tallies Z are placed, as seen in Fig. 2. When the tubes are thus charged, the upper surfaces of the various tallies are exactly flush with the entrances of said tubes, thereby permitting free play of the locking-plate T at the proper moment; but the lower counter rests directly upon the partition F' and occupies the rear portion of slot $d''$ of the slide D', as seen in Fig. 8. Assuming now that the tube C' is filled with counters each of which represents a value of five cents, and that a purchase of this amount has been made, the salesman or other custodian of the machine proceeds to register the sum by the following means: Grasping the hook $d'$, he gives the slide D' a quick forward jerk, the result of which is to eject the lower counter from the tube and cause said counter to descend the chute $a'''$ and fall directly into the salesman's hand. The counter must then be immediately placed in the five-cent passage of the guard-plate X' and allowed to drop down the coincident holes W' V' and again enter the tube C', where it now rests upon the tally Z. This operation is repeated every time a five-cent sale is made, the tally marking one step toward the bottom of the tube as each counter is ejected therefrom; but when the twentieth or special counter $y$ is delivered into the salesman's hand he knows that the moment the slide D' is retracted the tally Z will drop through the slot $d''$ and also through the opening $f'$ and fall directly into the pocket $e'$, where said tally is inaccessible to the salesman, and remains as proof that twenty counters have been discharged from the five-cent tube, and therefore he must account for one dollar. As soon as the salesman receives the roughened or other special counter $y$, he knows that when it is placed back in the tube a second tally of the same value must be deposited therein, so as to rest directly upon said special counter, a sufficient number of extra tallies of different denominations being kept in a receptacle convenient to the machine. These extra tallies must increase in value according to their order. Thus the first tally of the five-cent tube would be marked "$1," as seen in Fig. 10, while the second tally for the same tube would be marked "$2," and so on in regular progression; but the second tally for the ten-cent tube would be marked "$4" and the second tally of the fifteen-cent tube would be marked "$6;" or, in other words, the value of each successive tally is increased twice; but if he should neglect to put in the second or any succeeding tally at the proper moment it will be impossible for him to open the money-drawer A', which locking of said drawer is effected in the following manner: As long as each tube is filled with the appropriate number of counters and one tally, the locking-plate T can move back and forth with perfect freedom, because there is now nothing for either of its pawls $v$ or $v'$ to engage with; but if a tally should not be inserted at the proper moment the tube will not be full, and on this account the plate T can recede only a very limited distance until a pawl drops into said unfilled tube and thereby locks the entire mechanism. (See Fig. 7.) If, however, an attempt should be made to insert one more counter or tally within a tube than it will properly contain, the pawl will be raised and its free end penetrate the under side of lid A'' and prevent the machine operating until this extra piece is removed. The connection between the plate T and drawer A' is made by the bolt R, lever S, and link $s'$ and is of such a character as to necessitate said lever swinging a certain distance before said bolt can escape under the lower end of the lever. Now this escape can take place only after the plate T has been fully retracted, or, in other words, after said plate has moved so far as to permit the pawl to pass some distance beyond the tube. Therefore, the complete filling of each and every tube in the machine is a prerequisite to the opening of the money-drawer. When the slide D' is pulled forward, its stem G' swings the bell-crank I, through the medium of wire $i$, and thus causes the other wire $i'$ to elevate the rod $k$ and lift the tablet K to the position indicated by dotted lines in Fig. 2, which tablet is now exposed at the window $a$, and shows to the purchaser that the sum paid in by him has been properly accounted for. The bar O presses against the tablet-lifter $k$ with sufficient force to retain said tablet in its exposed position until the drawer A' is closed. This closure causes the bolt R to be forced down by contact with the chamfered end of lever S, the shank $r$ of said bolt being thereby brought in contact with the front end of lever Q. Consequently, the front end of this lever is depressed and its rear end elevated and brought in contact with the roller $p'$, thereby raising the rod P and swinging the front edge of the bar O upwardly. This act is accomplished in a moment, but is sufficient to liberate the elevated tablet and allow it to drop down to a normal or concealed position. The plate spring or tongue $c'$ (seen in Fig. 5) serves a threefold purpose, to wit: It prevents a counter being forced back into the tube at the lower end of the latter, and serves to guide the descending counter down the chute $a'''$. It also serves as a stop that prevents a too great retraction of the slide by bearing against the front end of slot $d''$. This illustration shows one counter in the act of being ejected from the tube, another counter resting on the slide in the rear of its slot, and five tallies deposited in the pocket $e'$. Therefore, the counters have made five complete circuits through the tube and have partially completed a sixth circuit through the same. At the close of the day the proprietor opens the drawers E E', observes the numbers on the upper tallies contained in the pockets $e\,e'$, and can tell in a moment how many times the counters have traversed their respective tubes. He then opens the lid A'' and notices the values on the upper counters in all the tubes, which values, being added to the aggregate of the tallies, indicates with unfailing accuracy the amount of money received by the salesman. These daily amounts can be preserved on slips deposited in the divisions $e''$ of the drawer and in similar divisions or pits $t''$ of the plate T.

In the modification of my invention seen in Fig. 11 the counter Y has a short lateral lug $y'$, adapted to enter a groove $c''$ in the front of the tube C, which arrangement compels said counter to be inserted in such a manner as to enable its value to be read in an instant by a person at the right-hand side of the machine; but in Fig. 12 the counter is elliptical and has a flattened end $y''$, which is to be grasped when said device is inserted within the tube.

I claim as my invention—

1. The within-described method of keeping an account of sales, which method consists in charging a receiver with a series of counters placed one upon another and surmounted by a tally, and then withdrawing the bottom counter and applying it to the top of the series, whereby said tally descends step by step at every such withdrawal and is finally deposited in another receptacle as soon as all the counters have made one complete circuit through said receiver, thus enabling them to perform an endless round, substantially as herein described.

2. The within-described method of keeping an account of sales, which method consists in charging a receiver with a series of counters having a readily-distinguished special counter at top, surmounting this special counter with a tally, then withdrawing the bottom counter and applying it to the top of the series, whereby said tally descends step by step at every such withdrawal and is finally deposited in another receptacle as soon as all the counters have made one complete circuit through said receiver, thus enabling them to perform an endless round, substantially as herein described.

3. In a machine for keeping an account of sales, a receiver for containing a tally, and a series of counters, a slotted slide located at the base of said receiver, a passage to permit the counters to be ejected from the machine by the movement of said slide, a separate opening through which the tally escapes, and a special receptacle to receive the discharged tally, substantially as described.

4. In a machine for keeping an account of sales, a tube for containing a series of counters, a slotted slide at the base of said tube for ejecting said counters singly, a reciprocating locking-plate above said tube and provided with a pawl, a sliding money-drawer, and devices for operating said plate from said drawer, the arrangement of these parts being such that the drawer can be opened only when said tube is completely filled with said counters, substantially as described.

5. In a machine for keeping an account of sales, the tube C', the slotted slide D' $d''$, located at the base of said tube, the plate T, adapted to reciprocate across the entrance of said tube and provided with an opening V' and pawl $v'$, the link $s'$, connecting said plate with the pivoted lever S $s$, and the sliding money-drawer A', provided with a spring-bolt R at its rear, for the purpose described.

6. In a machine for keeping an account of sales, the slotted money-drawer A' $a''''$, having a spring-bolt R with a shank $r$, the lever Q, pivoted to the case of the machine and held in a normal position by a spring, and the swinging bar O, provided with a lifting-rod P, having a spring and roller, for the purpose described.

7. In a machine for keeping an account of sales, the tube C', having a slotted slide D' $d''$, and a spring $c'$, whose free end traverses said slot, for the purpose described.

In testimony whereof I affix my signature in presence of two witnesses.

EDWIN H. MURDOCK.

Witnesses:
JAMES H. LAYMAN,
SAMUEL M. QUINN.